July 3, 1928.
C. W. LUMMIS
GAS PRODUCER
Filed June 27, 1919
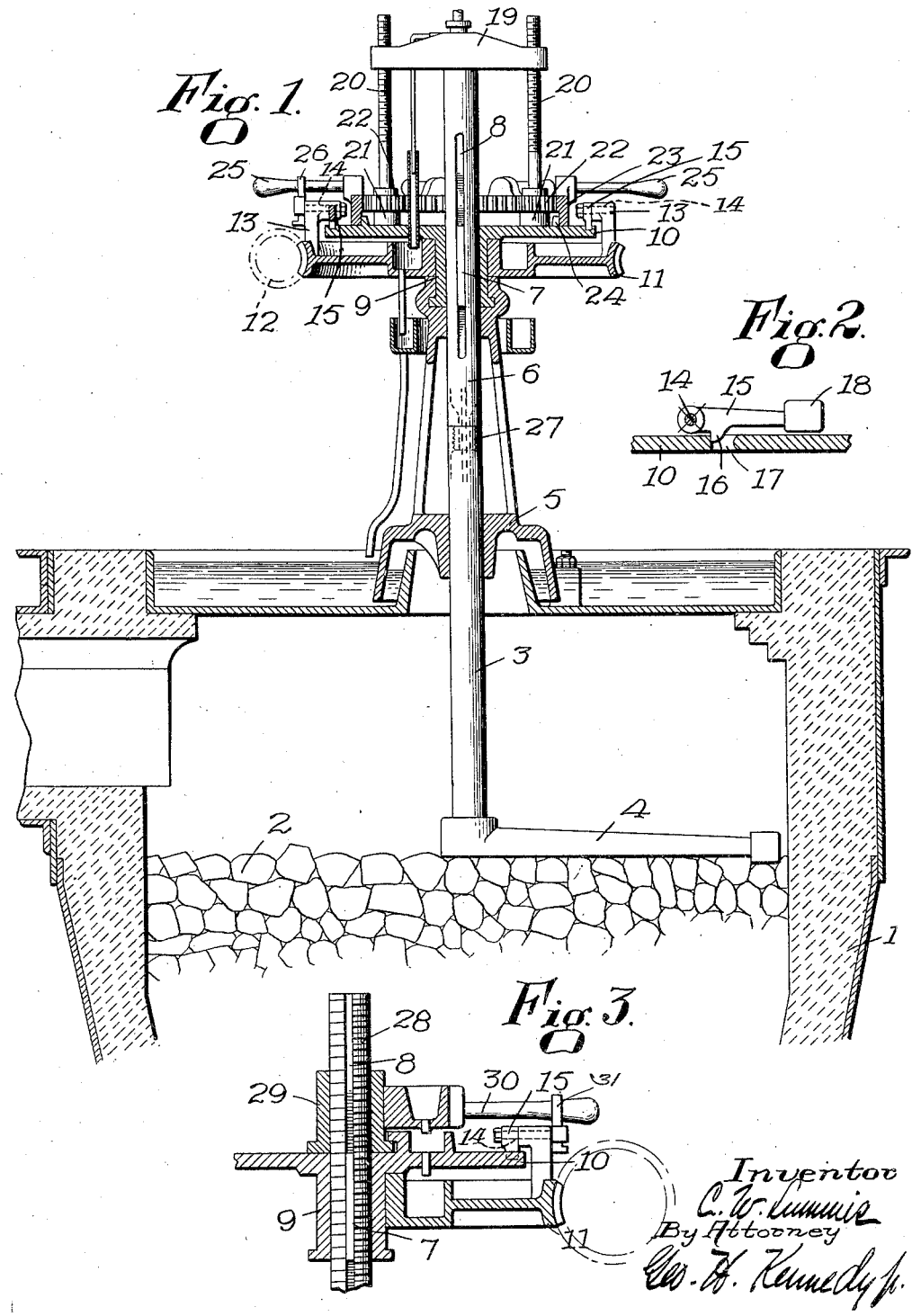
Inventor
C. W. Lummis
By Attorney
Geo. H. Kennedy Jr.

Patented July 3, 1928.

1,676,148

UNITED STATES PATENT OFFICE.

CHARLES W. LUMMIS, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

GAS PRODUCER.

Application filed June 27, 1919. Serial No. 307,136.

The present invention relates to gas producers, and in particular to mechanism adapted for levelling the surface of the bed of fuel in a gas producer, and for agitating the same to prevent the formation therein, by fusion, of solid masses of clinker or the like.

The invention contemplates the employment of a mechanically actuated agitating and levelling member that, in common with devices of this class now in use, has the capability of being adjusted to the variations that occur in the level of the bed of fuel, so as to be maintained at all times in operative relation to said bed. The present invention contemplates improvements in the construction and principle of operation of devices of this class whereby the responsiveness and dependability of the same are greatly increased; in particular, the invention contemplates the employment of a driving or actuating mechanism for a device of this class which is adapted to eliminate all possibility of breakage or distortion, such as would occur when the device, in sweeping over the fuel bed, encountered an undue resistance to its movement, for instance a large clinker or the like, projecting from the wall of the producer. The above and other objects are attained by the use of a mechanism hereinafter set forth and described, reference being had to the accompanying drawings, wherein Fig. 1 is a vertical sectional view of a gas producer equipped with the invention.

Fig. 2 is a fragmentary sectional view, looking at the right hand side of Fig. 1.

Fig. 3 is a vertical sectional view of mechanism constituting a modification of the mechanism shown in Fig. 1.

Like reference characters refer to like parts in the different figures.

The invention as herein shown is applied to a gas producer of ordinary construction, comprising the usual fuel shell 1 for the retention of a bed of fuel 2 that undergoes gasification therein. Projecting through the top of the shell 1 is a vertical shaft 3, by the rotation of which a bar 4, at the lower end of said shaft, is caused to traverse continuously over substantially the entire surface of the bed 2, so as to level the same and at the same time give it the requisite agitation, thus providing a relative transversing movement between the member 4 and the fuel bed, as is common in devices of this class.

The shaft 3 is journalled in a stand 5, which, as here shown, provides suitable bearings for said shaft and for its upper extension 6. In order to rotate the shaft, said upper extension is connected by a feather key 7 and key-way 8, with the hub 9 of a disk 10, the hub surrounding the shaft and being suitably journalled in the upper bearing of stand 5. It will thus be seen that when the disk 10 is rotated, in the manner hereinafter described, its rotation will be imparted to the shaft 3 and arm 4, and at the same time said shaft and arm may be moved vertically, relative to said disk, due to the elongation of the key-way 8, in which the key 7 slides freely.

For imparting rotation to the disk 10, there is journalled on the hub 9 thereof a freely rotating worm gear 11, that is driven by a worm 12 from any suitable source of power, not shown. The worm gear 11 carries a pair of diametrically opposite upstanding brackets 13, 13, which project above and beyond the periphery of the disk 10. Each bracket 13 provides a pivotal support 14 for a dog 15, the under edge of which has a projection 16 that is adapted to engage in corresponding notches or recesses 17, 17, two in number, of the disk 10. The dogs 15 on their free ends carry suitable weights 18 that offer the requisite resistance to the lifting of said dogs, and hence hold the projection 16 in engagement with the disk 10, so as to cause rotation of the same in unison with the worm gear 11.

Under normal conditions of operation, the arm 4 is thus caused, by the rotation of shaft 3, to traverse the surface of the fuel bed, and it is apparent that, in the absence of undue resistance to the rotation of said arm, the dogs 15, by reason of the weights 18 on their ends, will normally act as a non-positive clutch between the gear 11 and the disk 10 for this purpose. However, when the arm 4 strikes an obstruction such as a large clinker projecting from the wall of the shell 1, that offers an undue resistance to its movement, that is, such a resistance as might twist or distort the shaft 3, or break the arm 4, then, by the rotation of gear 11, the dogs 15 will be rocked upwardly about their pivots 14 in a counter-clockwise direction, Fig. 2, so as to disengage their projections 16 from the slots or recesses 17 of the disk 10. Under these conditions, with the worm gear continuing to rotate, the projections 16 of the dogs 15 will ride over the surface of the disk 10, which latter remains stationary. At each half revolution of the worm gear 11, the projections 16 will drop by gravity into the slots 17, but in the absence of a sufficient decrease in the resistance to rotation of the arm 4, said dogs 15 will, as before, again and repeatedly be rocked upwardly about their pivots, and will thus fail to reestablish the driving connection with the disk 10. In other words, periodically, or at each half revolution of the worm gear 11, pressure tending to rotate the arm 4 will be applied, but if the resistance to such rotation still remains excessive, the pressure automatically is discontinued. It will thus be seen that the mechanism as constructed will cease to apply power for the rotation of the arm whenever the resistance to such rotation is liable to cause breakage or distortion of the parts; that is, whenever such resistance is great enough to rock the weighted dogs 15 upwardly. The interruption to the rotation of the arm 4 will continue just as long as this undue resistance to its rotation exists, and hence all danger of breakage or distortion is eliminated.

The mechanism is further designed to automatically adjust itself under the conditions above described so as to allow the arm 4 to resume its rotation in a position where said resistance is reduced, or where said arm will have power enough to break through the obstruction. To this end, the shaft extension 6 has secured to its top a crosshead 19, in the ends of which are threaded two vertical screws 20, 20, that are adapted to turn in bearings 21, 21, provided by the top of disk 10. Each screw has secured thereon a gear 22, said gears 22 being in mesh with an internal gear ring 23 that is centered on the disk 10 by means of a flange 24, and is free to turn thereon. The internal gear ring 23 is provided with opposite outwardly projecting arms 25, 25, by means of which it may be turned in either direction; in one direction, it rotates the screws 20 to raise the crosshead 19, and with it the shaft 3 and arm 4, while in the other direction, it lowers said parts to carry the arm 4 into contact with the fuel bed. The arms 25 provide a means for manually rotating the ring 23 in such a direction as to cause the shaft 3 and member 4 to be lowered; the raising of said shaft and member in the event of undue resistance to rotation of the same, is accomplished automatically in a manner which will now be described:—

One of the brackets 13 of worm wheel 11 carries a latch 26, which is adapted to be elevated into a position to strike the arms 25 in the rotation of said worm wheel. It will thus be apparent that when a stoppage of the arm 4 and disk 10 ensues as a result of an undue resistance to rotation, the continued revolution of the worm wheel 11 will cause the latch 26 to revolve the gear ring 23, whereby the screws 20, 20, will operate to slowly raise the shaft and with it the arm 4. At each half revolution of the worm wheel 11, the projections 16 of dogs 15 will fall into the notches 17 of disk 10, and very soon, owing to the gradual elevation of the arm 4 that reduces the resistance to its rotation, the weighted dogs 15 will be enabled to transmit the power required for rotation, and the device will resume its normal operation. In this connection it is to be noted that, upon the resumption of normal operation, the arms 25 afford a means for manually lowering the arm 4, in the event of its having been raised too high by the action above described. This is done by depressing the latch 26, which permits the free rotation of arms 25 for the above purpose.

As shown in Fig. 1, the shaft 3 and its upper extension 6 are made separate, being held together by a suitable coupling, such as that shown at 27. If the arm 4 should burn out or otherwise become damaged, this permits the substitution of another shaft 3 and arm 4 without disassembling or in any way disturbing the driving mechanism other than to unscrew the upper section 6 from the lower section 3. In order to permit the ready removal of the arm 4 under these conditions, the stand 5 may be split vertically in a well known manner.

In the modified form of the invention shown in Fig. 3, the safety driving connection between the disk 10 and worm gear 11 is the same as above described. The vertical adjustment of the device, however, is accomplished without the use of the screws 20, 20, the latter being replaced by a screw thread formed on the shaft of the arm 4 itself, here designated as a shaft 28. Said shaft 28 is in screw threaded engagement with a collar 29 that is supported on the disk 10, said collar carrying opposite outwardly projecting arms 30, 30 (only one being shown), that are adapted to be engaged by a latch 31 carried by the worm gear 11. The operation of this mechanism is the same as the operation of the mechanism shown in Fig. 1, it being clear that the collar 29 with its projecting portions 30, 30, constitutes a means for manually adjusting the height of the arm 4 with relation to the bed of fuel, or in other words, a means for causing said arm to operate at a predetermined level, at or below the surface of the bed. When the latch 31 comes into play, it operates in precisely the same manner as the latch 26, to raise the arm 4 to a position where it will have enough power to break through the obstruction that has caused its stoppage, through the upward rocking of the dogs 15.

It will be seen therefore that both forms of the invention herein illustrated contemplate a leveller or agitator that is adapted to operate continuously in any position at which it is set or adjusted, until an undue and predetermined resistance is imposed against its rotation; thereupon, for the purpose of preventing breakage or distortion of the parts, the transmission of power to the device is wholly and automatically interrupted, and before any power is again applied to rotate the device, the latter is automatically shifted to a position where the resistance to rotation is reduced.

In respect of this mode of operation, the present invention is to be distinguished from certain prior devices of this class, wherein rotation is imparted to the agitating member by revolving a lug that bears against a spiral feather on the shaft of the member, and wherein, notwithstanding the lifting action of the spiral, there is exerted an extreme and continuous pressure on the shaft and member, whenever the latter encounters an obstruction that imposes an undue resistance to its rotation. No claim is made herein to any such construction or mode of operation as characterizes a device of the above-mentioned type, but what is herein claimed is:—

1. In a gas producer, an agitating member for the fuel bed in said producer, continuously rotating actuating means adapted normally to impart rotation to said agitating member at a predetermined fuel level in the producer, means for rendering said actuating means wholly inoperative for the rotation of said agitating member in the event of undue resistance to said rotation at said predetermined fuel level, means for applying the rotation of said actuating means to the elevation of said agitating member while said undue resistance prevails, and means periodically operative during the elevation of said agitating member for applying pressure against said resistance through the continued rotation of said actuating means.

2. In a gas producer, an agitator for the fuel bed in said producer, a rotatably mounted member, a connection from said member to said agitator to constrain their rotation in unison while permitting relative vertical adjustment between them, a continuously rotating actuator for said rotatably mounted member, a yieldable clutch connection between said actuator and said rotatably mounted member adapted normally to rotate said agitator, through said rotatably mounted member, at a predetermined fuel level in the producer, said clutch connection being adapted to yield in the event of undue resistance to the rotation of said agitator at said predetermined fuel level, whereby said actuator can continue to rotate without any rotation of said rotatably mounted member and said agitator, and means responsive to such continuing rotation of said actuator for adjusting said agitator vertically, relatively to said rotatably mounted member, to a level above the fuel level at which arose the undue resistance to agitator rotation.

Dated this 17th day of June, 1919.

CHARLES W. LUMMIS.